US009275348B2

(12) United States Patent
Bhatt et al.

(10) Patent No.: US 9,275,348 B2
(45) Date of Patent: Mar. 1, 2016

(54) IDENTIFYING PARTICIPANTS FOR COLLABORATION IN A THREAT EXCHANGE COMMUNITY

(71) Applicant: Hewlett-Packard Development Company, L.P., Houston, TX (US)

(72) Inventors: Sandeep N. Bhatt, Madison, NJ (US); William G. Horne, Lawrenceville, NJ (US); Daniel L. Moor, Midland, MI (US); Suranjan Pramanik, Fremont, CA (US); Tomas Sander, New York, NY (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 413 days.

(21) Appl. No.: 13/754,974

(22) Filed: Jan. 31, 2013

(65) Prior Publication Data
US 2014/0214938 A1    Jul. 31, 2014

(51) Int. Cl.
*G06Q 10/00* (2012.01)
*H04L 29/06* (2006.01)

(52) U.S. Cl.
CPC ............ *G06Q 10/00* (2013.01); *H04L 63/1408* (2013.01); *H04L 63/20* (2013.01)

(58) Field of Classification Search
CPC . H04L 63/0823; H04L 63/20; H04L 63/1408; H04L 29/06; G06F 17/28; G06Q 10/00
USPC ................... 709/200, 209; 380/280
See application file for complete search history.

(56) References Cited

U.S. PATENT DOCUMENTS

| 6,807,569 | B1 | 10/2004 | Bhimani et al. |
| 7,461,036 | B2 | 12/2008 | Genty et al. |
| 7,594,224 | B2 | 9/2009 | Patrick et al. |
| 7,779,119 | B2 | 8/2010 | Ginter et al. |
| 7,784,097 | B1 * | 8/2010 | Stolfo et al. ................. 709/227 |
| 7,841,008 | B1 | 11/2010 | Cole et al. |
| 7,953,846 | B1 | 5/2011 | Amoroso et al. |
| 7,996,888 | B2 | 8/2011 | Asunmaa et al. |
| 8,065,725 | B2 * | 11/2011 | Zheng et al. ................. 709/200 |
| 8,204,813 | B2 | 6/2012 | Merkoulovitch et al. |
| 8,286,239 | B1 | 10/2012 | Sutton |
| 8,327,442 | B2 | 12/2012 | Herz et al. |
| 8,904,520 | B1 * | 12/2014 | Nachenberg et al. ........... 726/22 |

(Continued)

OTHER PUBLICATIONS

Evans, et al., "Context-derived Pseudonyms for Protection of Privacy in Transport Middleware and Applications", Proceedings of the Fifth IEEE International Conference on Pervasive Computing and Communications Workshops (PERCOMW07), Mar. 2007, 6 pages.

(Continued)

*Primary Examiner* — Ebrahim Golabbakhsh
(74) *Attorney, Agent, or Firm* — Brooks, Cameron & Huebsch, PLLC (57) ABSTRACT

Identifying participants for collaboration in a threat exchange community can include receiving security data from a plurality of participants at a threat exchange server within the threat exchange community; and in response to receiving from a first participant from the plurality of participants security data associated with a security occurrence, identifying at the threat exchange server the first participant and a second participant from the plurality of participants for collaboration based on characteristics of the first participant and the second participant.

20 Claims, 3 Drawing Sheets

(56) References Cited

U.S. PATENT DOCUMENTS

| | | | |
|---|---|---|---|
| 2003/0182421 A1* | 9/2003 | Faybishenko et al. | 709/224 |
| 2005/0102534 A1 | 5/2005 | Wong | |
| 2005/0257264 A1* | 11/2005 | Stolfo et al. | 726/23 |
| 2007/0169171 A1 | 7/2007 | Kumar et al. | |
| 2007/0277242 A1* | 11/2007 | Baker et al. | 726/25 |
| 2008/0172382 A1 | 7/2008 | Prettejohn | |
| 2010/0299292 A1 | 11/2010 | Collazo | |
| 2011/0153383 A1 | 6/2011 | Bhattacharjya et al. | |
| 2011/0161069 A1 | 6/2011 | Staffel | |
| 2011/0161452 A1* | 6/2011 | Poornachandran et al. | 709/207 |
| 2011/0173699 A1 | 7/2011 | Figlin et al. | |
| 2011/0239270 A1 | 9/2011 | Sovio et al. | |
| 2011/0302653 A1 | 12/2011 | Lloyd et al. | |
| 2012/0072983 A1 | 3/2012 | McCusker et al. | |
| 2012/0233698 A1 | 9/2012 | Watters et al. | |
| 2012/0246730 A1 | 9/2012 | Raad et al. | |
| 2012/0311703 A1* | 12/2012 | Yanovsky et al. | 726/22 |
| 2013/0254343 A1* | 9/2013 | Stevens et al. | 709/219 |

OTHER PUBLICATIONS

Fiat, et al., "Broadcast Encryption", Advances in Cryptology (CRYPTO'93), Lecture Notes in Computer Science, vol. 773, Jul. 1994, 13 pages.

Neubauer., "An Evaluation of Technologies for the Pseudonymization of Medical Data", In Computer and Information Science, SCI 208, Apr. 2009, pp. 47-60.

Sweeney, Latanya., "Uniqueness of simple demographics in the U.S. population", (Shorter Version: "Simple Demographics Often Identify People Uniquely") LIDAPWP4, Carnegie Mellon University, Laboratory for International Data Privacy, Pittsburgh, PA, May 2000, 34 pages.

Ando, et al., "Parallel analysis for lightweight network incident detection using nonlinear adaptive systems", Proceedings of IFIP International Conference on Network and Parallel Computing, Sep. 18-21, 2007, 7 pages.

Jain, et al., "Data Clustering: A Review", ACM Computing Surveys, vol. 31, No. 3, Sep. 1999, pp. 264-323.

Julisch, K., "Mining Alarm Clusters to Improve Alarm Handling Efficiency", Proceedings of the 17th Annual Computer Security Applications Conference (ACSAC01), Dec. 10-14, 2001, 10 pages.

Lee, W., "A Data Mining Framework for Constructing Features and Models for Intrusion Detection Systems", PhD Thesis, Columbia University, 1999, 193 pages.

Katti, et al., "Collaborating Against Common Enemies", ACM Internet Measurement Conference, Aug. 2005, 23 pages.

Punj, et al., "Cluster Analysis in Marketing Research: Review and Suggestions for Application", Journal of Marketing Research, vol. 20, No. 2, May 1983, pp. 134-148.

Porras, et al., "A Mission-Impact-Based Approach to INFOSEC Alarm Correlation", Proc. Int'l Symp. The Recent Advances in Intrusion Detection, Oct. 2002, 19 pages.

Vaarandi, Risto "A data clustering algorithm for mining patterns from event logs", 3rd IEEE Workshop on IP Operations and Management, 2003, (IPOM 2003), Oct. 1-3, 2003, 8 pages.

Wedel, et al., "Market Segmentation: Conceptual and Methodological Foundations", Journal of Targeting Measurement and Analysis for Marketing, Aug. 2000, Kluwer Academic Publishers, vol. 9, Issue: 1, 2 pages.

Boggs, et al., "Cross-domain Collaborative Anomaly Detection: So Far Yet So Close", 12th International Symposium on Recent Advances in Intrusion Detection, RAID 2009, Saint-Malo, Brittany, France, Sep. 23-25, 2009, 20 pages.

Zhang, et al., "Highly Predictive Blacklisting", 17th USENIX Security Symposium, San Jose, CA, USA, Jul. 28-Aug. 1, 2008, pp. 107-122.

Sundaramurthy, et al., "Examining Intrusion Prevention System Events from Worldwide Networks", 19th ACM Pre-Conference on Building Analysis Datasets and Gathering Experience Returns for Security (BADGERS'12), Raleigh, NC, USA, Oct. 15, 2012, 8 pages.

Abdulrahman, "Investigating the Technological and Practical Levels of Maturity of the Industry to Implement Web Services Security", Master's Thesis for: Department of Numerical Analysis and Computer Science, Stockholm Royal Institute of Technology, Oct. 2005, 92 pages.

Ben-Shalom, et al., "Granular Trust Model Improves Enterprise Security", www.intel.com/IT, Intel Corporation, Nov. 2012, 8 pages.

Zhou, et al., "Modeling Network Intrusion Detection Alerts for Correlation", ACM Transactions on Information and System Security, vol. 10, No. 1, Article 4, Feb. 2007, 31 pages.

Unknown., "Monitoring, Analysis, and Correlation" Accessed via: http http://www.cisco.com/en/US/docs/solutions/Enterprise/Seourity/SAFE_RG/chap10.html, Dec. 2012, 26 pages.

Unknown., "Real-Time Threat Management—Securing Your Journey to the Cloud", Trend Micro, Jun. 2011, 2 pages.

Kaplan, Dan., "Sharing the pie: Threat Collaboration", Accessed via: http://www.scmagazine.com/sharing-the-pie-threat-collaboration/article/250421/, SC Magazine, Aug. 1, 2012, 3 pages.

Unknown., "AlienVault Open Threat Exchange" Dec. 2012, 2 pages.

Phillips, et al., "Information Sharing and Security in Dynamic Coalitions," Jun. 2002, 16 pages.

Fokoue, et al., "A Decision Support System for Secure Information Sharing," the 14th ACM Symposium on Access Control Models and Technologies SACMAT'09, Jun. 3-5, 2009, Stresa, Italy, 10 pages.

\* cited by examiner

IDENTIFYING PARTICIPANTS FOR COLLABORATION IN A THREAT EXCHANGE COMMUNITY

BACKGROUND

Entities maintain internal networks with one or more connections to the Internet. Internal networks include a plurality of resources connected by communication links, and can be used to connect people, provide services—both internally and externally via the Internet—and/or organize information, among other activities associated with an entity. Resources on the network can be susceptible to security attacks that originate either within the internal network or on the Internet. A security attack can include an attempt to use, destroy, alert, disable, steal, and/or gain unauthorized access to an asset (e.g., a resource, data, and information). Multiple organizations and companies can be both susceptible to, and subject to, common security threats and attacks.

DETAILED DESCRIPTION

Entities can avoid security attacks by identifying vulnerabilities in their networks. A vulnerability can include a flaw and/or weakness in the network's design, implementation, and/or operation and management that could be exploited to violate the network's security policy (e.g., a circumstance and/or an event with the potential to adversely impact a network through unauthorized access, destruction, disclosure, and/or modification of an asset of the entity). As used herein, an exploit can include machine readable instructions (e.g., software), data (e.g., a chunk of data), and/or a sequence of commands that take advantage of a vulnerability to cause unintended and/or unanticipated behavior. A security attack can include the attempted use of a number of exploits against a number of vulnerabilities. To avoid subsequent security attacks, an entity can perform an investigation (e.g., forensic investigation) to determine what exploits were used against what vulnerabilities during the security attack.

Entities face increasingly sophisticated, professional, organized, and well-funded security attacks on their information technology (IT) infrastructures. By quickly and accurately detecting, identifying, and/or addressing security threats (e.g. information that can indicate the possibility of an impending security attack), an entity can mitigate the effects of security attacks. However, entities may find it increasingly difficult to quickly and accurately detect, identify, and/or address these security threats on their own. Encouraging entities to share information relating to security threats facing their IT infrastructure may improve the speed and/or accuracy in detecting emerging threats. However, entities may be highly reluctant to collaborate if it leads to reputational risk, security risk, and/or liability for the entities.

In contrast, in accordance with examples of the present disclosure, an entity can participate in a threat exchange community to identify security threats with low reputational risk, security risk, and/or liabilities to the entities. A threat exchange community can include a group of computing systems that exchange information related to information technology infrastructures (e.g., systems and services) via communications links. The computing systems can be referred to as participants of the threat exchange community. In some examples, entities including or controlling the computing systems can also be referred to as participants of the threat exchange community.

As an example, a threat exchange community can include a participant server or group of participant servers within the information technology infrastructure of each entity from a group of entities. Each participant server (or each group of participant servers) can provide information related to actions within or at the information technology infrastructure including that participant server to a threat exchange server. The threat exchange server can analyze information provided by each participant server to identify security occurrences within the threat exchange community, and provide alerts related to the security occurrences to participant servers. A security occurrence, as used herein, can include variables and information (e.g., data) that influence an action by the threat exchange server. For example, such occurrences that influence an action can include a security context, a security attack, a security threat, a suspicious event, a vulnerability, an exploit, an alert, an incident, and/or other relevant events, identified using the participant provided information.

In some examples, participant servers communicate in a peer-to-peer architecture and the threat exchange server, or functionalities thereof, is distributed across the participant servers or a subset of the participant servers. That is, in some examples a threat exchange community does not include a centralized threat exchange server. Rather, the threat exchange server is realized at a group of participant servers.

Identifying participants for collaboration in a threat exchange community according to the present disclosure can increase the speed and/or accuracy with which the participants can detect, identify, and/or mitigate complex security threats and/or attacks. Participants in the threat exchange community, connected through a threat exchange server, may collaborate in a manner that protects the confidentiality of the participants to a level of their choosing while maintaining the ability to obtain data that can be used to protect against attacks.

Systems, methods, and computer-readable and executable instructions are provided for identifying participants for collaboration in a threat exchange community. Identifying participants for collaboration in a threat exchange community can include receiving security data from a plurality of participants at a threat exchange server within the threat exchange community; and in response to receiving from a first participant from the plurality of participants security data associated with a security occurrence, identifying at the threat exchange server the first participant and a second participant from the plurality of participants for collaboration based on characteristics of the first participant and the second participant.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, the designator "N", particularly with respect to reference numerals in the drawings, indicate that a number of the particular feature so designated can be included with a number of examples of the present disclosure. Also, as used herein, "a number of" an element and/or feature can refer to one or more of such elements and/or features. For example, "a number of participants" can refer to one or more participants. As used herein, "a second participant" can refer to one or more participants.

Figure 1:
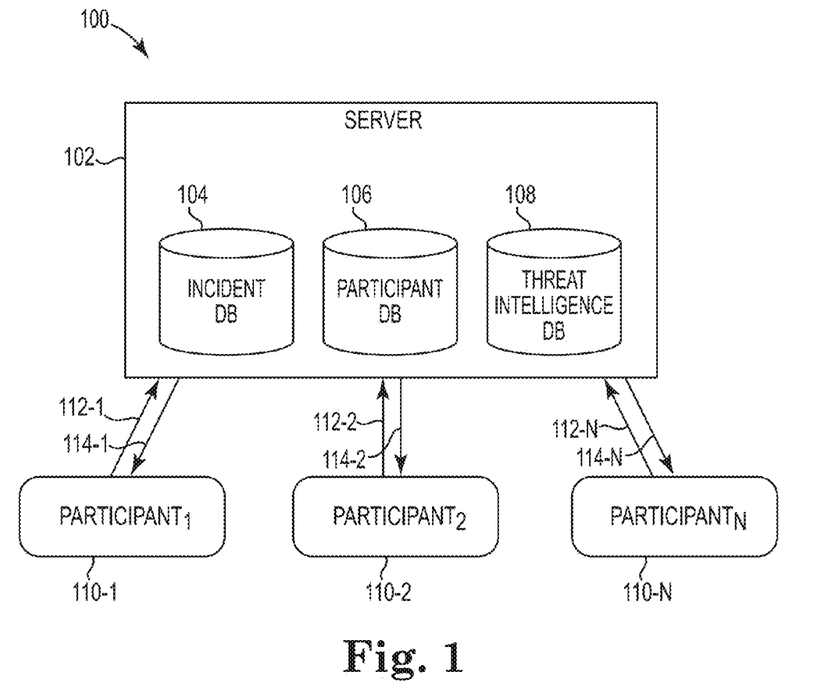
FIG. 1 is a block diagram illustrating an example of an environment for identifying participants for collaboration in a threat exchange community according to the present disclosure.

FIG. 1 is a block diagram illustrating an example of an environment 100 for identifying participants for collaboration in a threat exchange community according to the present disclosure. The environment 100 can include a threat exchange community. A threat exchange community can include a plurality of participants 110-1, 110-2, . . . , 110-N that are connected to a threat exchange server 102. The arrows as illustrated in the example of FIG. 1 illustrate communication between the threat exchange server 102 and the plurality of participants 110-1, 110-2, . . . , 110-N. The communication illustrated by the arrows can include communication links (e.g., network connections).

A plurality of participants 110-1, 110-2, . . . , 110-N can provide data to a threat exchange server 102 (e.g., as illustrated by the arrows 112-1, 112-2, . . . , 112-N from the participants 110-1, 110-2, . . . , 110-N to the threat exchange server 102). The participant provided data can include security data and/or participant characteristic data. For instance, security data can describe security occurrences, such as security attacks, security threats, and/or other suspicious events. Participant characteristic data can include infrastructure data, industry sector identification, and/or size of the entity, for example. In a number of examples, participant characteristic data can include historical security data identifying previous security occurrences identified by a participant. The participant characteristic data can include permitted collaboration lists that identify participants that the entity has approved for collaboration and participants that the entity has not approved for collaboration. The participant characteristic data, in various examples, can be dynamic (e.g., changing over time) and/or static.

A threat exchange server 102, in a number of examples, can be provided to participants 110-1, . . . , 110-N as a service (e.g., a threat exchange service). In a number of examples, the threat exchange server 102 can be provided to participants 110-1, . . . , 110-N as a part of a service. A service, as used herein, can include an intangible commodity offered to users. For instance, services offered can include computing resources (e.g., storage, memory, processing resources) and/or computer-readable instructions (e.g., programs).

A threat exchange server 102, as used herein, can include computer hardware components (e.g., a physical server, processing resource, memory resource) and/or computer-readable instruction components designed and/or designated to provide a number of threat exchange functions. The threat exchange server 102, as illustrated in the example of FIG. 1, can include and/or access an incident database 104, a participant database 106, and/or a threat intelligence database 108.

A database, as used herein, can include a structured collection of data. An incident database 104 can be a database containing current and historical security occurrences of the threat exchange community (e.g., as reported by the participants 110-1, 110-2, . . . , 110-N). Current security occurrences can include security occurrences that are unresolved. Historical security occurrences can include security occurrences that have been resolved and/or are no longer considered a current security occurrence.

A participant database 106 can be a database containing participant characteristic data. As used herein, participant characteristic data can include IT system information, industry sector information, and/or infrastructure information (e.g., hardware and/or program instructions information), among other data related to each of the participants 110-1, 110-2, . . . , 110-N. For example, participant characteristic data can include information about software running within the participant's infrastructure, such as application names, application versions, and/or operating system patch levels.

The threat intelligence database 108 can be a database containing external and internal threat intelligence. For example, threat intelligence can include characteristics and/or symptoms that are associated with a security attack and/or a security threat.

A threat exchange server 102 can compare incoming security data from a plurality of participants 110-1, 110-2, . . . , 110-N to an incident database 104, a participant database 106, and/or a threat intelligence database 108 to identify the participants 110-1, 110-2, . . . , 110-N for collaboration.

For example, based on security data provided from a first participant 110-1, a security occurrence of the first participant 110-1 can be identified, such as a security attack. Identifying the security occurrence can include identifying a characteristic of the security occurrence, such as an order in which entities are targeted by a security attack. A characteristic of a security occurrence, as used herein, can include an identified symptom associated with the security occurrence. For example, a symptom can include a pattern of a plurality of actions, incidents, and/or events associated with the security occurrence, and/or an internet protocol (IP) address associated with the security occurrence.

Incoming security data provided to a threat exchange server 102 can be combined with participant characteristic data (e.g., data in the participant database 106) and/or with threat intelligence data (e.g., data in the threat intelligence database 108). Combining participant characteristic data with incoming security data can be used to identify for collaboration a number of participants in the threat exchange community that at least partially include the identified symptom associated with the security occurrence. For instance, the threat exchange server 102 may receive security data from a first participant 110-1. A security occurrence can be identified based on the security data provided. The threat exchange server 102 can automatically identify a number of other participants 110-2, . . . , 110-N that exhibit similar symptoms, or symptoms that partially match the pattern of the security data and alert the identified participants of a potential security threat and suggest that the identified participants collaborate with the first participant 110-1.

In a number of examples, each of the participants 110-1, 110-2, . . . , 110-N can identify entities with which each of the participants 110-1, 110-2, . . . , 110-N are or are not willing to collaborate. The participants 110-1, 110-2, . . . , 110-N can identify entities by name, by pseudonym, by participant characteristic data, and/or by participant confidence rating (discussed further herein), for example. For instance, a first participant 110-1 can identify that it is willing to collaborate with entities in the banking industry and that it is not willing to collaborate with entities in the software development industry. In a number of examples, participant 110-1 can identify that it is not willing to collaborate with entities with a confidence rating below a specified threshold. An identified entity may or may not be a participant in the threat exchange community. Furthermore, each of the participants 110-1, 110-2, . . . , 110-N can modify the list of entities with which it is or is not willing to collaborate by adding or removing identified entities.

A threat exchange server 102 can suggest that participants collaborate to identify the cause of the security occurrence, to determine whether the security occurrence is malicious or benign, and/or to determine an appropriate response to the security occurrence. For example, the threat exchange server 102 can receive security data from participant 110-1, identify a security occurrence from the received security data, identify that participant 110-1 is willing to collaborate with participant 110-2, and suggest to participant 110-1 and participant 110-2 that they collaborate.

A threat exchange server 102 can notify participants 110-1, 110-2, . . . , 110-N of a suggestion to collaborate (e.g., as illustrated by the arrows 114-1, 114-2, . . . , 114-N from the threat exchange server 102 to participants 110-1, 110-2, . . . , 110-N). The threat exchange server 102 can suggest that participants collaborate by displaying an image, message, and/or icon on a user interface. However, examples are not so limited. The threat exchange server 102 can suggest that participants collaborate using a number of communication means, such as by sending an electronic mail notification, identifying the suggested participants by pseudonym. A sound may be used by the threat exchange server 102 to notify participants of a suggestion to collaborate. Upon receiving a suggestion to collaborate, a certain sound file may be caused to play on the participant's computing device.

In a number of examples, upon receiving security data from the first participant 110-1, a threat exchange server 102 can automatically identify the second participant 110-2 that could collaborate with the first participant 110-1. The first participant 110-1 can report security data to the threat exchange server 102. The threat exchange server 102 can execute instructions to identify a security occurrence and/or a symptom associated with that security occurrence from the security data. The threat exchange server 102 can identify that the first participant 110-1 and the second participant 110-2 reported a historical security occurrence that at least partially included the identified symptom associated with the security occurrence by comparing the security occurrence and/or the symptom associated with the security occurrence against the incident database 104. The threat exchange server 102 can verify that the second participant 110-2 is a participant that the first participant 110-1 is willing to collaborate with.

In a number of examples, the threat exchange server 102 can identify a plurality of other participants that can collaborate with the first participant, based on the security data (e.g., based on security occurrences and/or symptoms associated with security occurrences). The threat exchange server 102 can compare the plurality of other participants that can collaborate with the first participant 110-1 against the list of participants with which the first participant 110-1 is willing to collaborate. The threat exchange server 102 can recommend (e.g. suggest) to the first participant 110-1 and a subset of the plurality of other participants that they collaborate to respond to the security occurrence.

In a number of examples, a first participant 110-1 can submit a request for collaboration to the threat exchange server 102, wherein the request for collaboration can include security data. A second participant 110-2 of the threat exchange community can respond to the request for collaboration. Upon submitting a request for collaboration, the first participant 110-1 can receive a unique pseudonym to use with that particular request for collaboration. The second participant 110-2 can receive a unique pseudonym to use with a particular request for collaboration upon responding to the particular request for collaboration. The requesting participant and the responding participant can receive new pseudonyms associated with each request for collaboration in response to initiating a new request for collaboration.

For example, the first participant 110-1 can be associated with a unique pseudonym (e.g. 1234ABCD) for the purposes of anonymously collaborating with other participants 110-2, . . . , 110-N in order to respond to the security occurrence and in response to a first request for collaboration. The second participant 110-2 can also be associated with a unique pseudonym (e.g. 3456DEFG) for the purposes of anonymously collaborating with the first participant 110-1. In response to responding to a second request for collaboration, the first participant 110-1 and the second participant 110-2 can be associated with new and unique pseudonyms (e.g. 9876WXYZ and 8765UVWX, respectively) for the purposes of anonymously collaborating in order to respond to the second request for collaboration. The use of a new, unique pseudonym with each new request for collaboration allows the first participant and the second participant to anonymously collaborate multiple times while maintaining identity confidentiality.

Each of the participants 110-1, 110-2, . . . , 110-N of the threat exchange community can be associated with a confidence rating. A confidence rating can be assigned to each of the participants 110-1, 110-2, . . . , 110-N. The confidence rating can represent the security expertise of each of the participants 110-1, 110-2, . . . , 110-N. The confidence rating can be determined based on the participants' 110-1, 110-2, . . . , 110-N industry, business type, the complexity of the participants' past contributions to the threat exchange server 102 and/or the participants' analysis capability. The confidence rating assigned to each of the participants 110-1, 110-2, . . . , 110-N can be determined based on past experience of threat exchange participants with the specific entity's recommendations (e.g., peer ratings). The confidence rating may be expressed as a number within a range of numbers wherein the lower the confidence rating, the lower the number within the range and the higher the confidence rating, the higher the number within the range. The confidence rating can also be expressed with an icon, image, and/or a number of icons and/or images. For example, a low confidence rating can be expressed with a singular star whereas a high confidence rating can be expressed with five stars. Confidence ratings can be dynamic and reflect a real-time measure of the security expertise of the participants 110-1, 110-2, . . . , 110-N.

In a number of examples, the threat exchange server can execute instructions to assign a confidence rating to each of the participants 110-1, 110-2, . . . , 110-N automatically without participant feedback. For example, a first participant 110-1 that frequently collaborates with a number of other participants in the threat exchange community can be assigned a higher confidence rating than a second participant 110-2 that has never collaborated with a number of other participants in the threat exchange community. In another example, a first participant 110-1 can be automatically assigned a high confidence rating by the threat exchange server 102 because the first participant 110-2 has collaborated with a number of other participants in the threat exchange community to address security occurrences and/or symptoms associated with the security occurrences that have been identified by the threat exchange server 102 as highly complex and/or technical.

In a number of examples, participants can assign a confidence rating to each of the participants 110-1, 110-2, ..., 110-N based on participant feedback. For example, a first participant 110-1 can rate a second participant 110-2 after the first participant and the second participant collaborate. The first participant 110-1 can assign a high confidence rating to the second participant 110-2 indicating that the second participant 110-2 provided helpful recommendations to address a highly complex and technical security occurrence. In another example, the first participant 110-1 can assign a low confidence rating to the second participant 110-2 indicating that the second participant 110-2 provided erroneous, incorrect, and/or incomplete recommendations to address a security occurrence.

Figure 2:
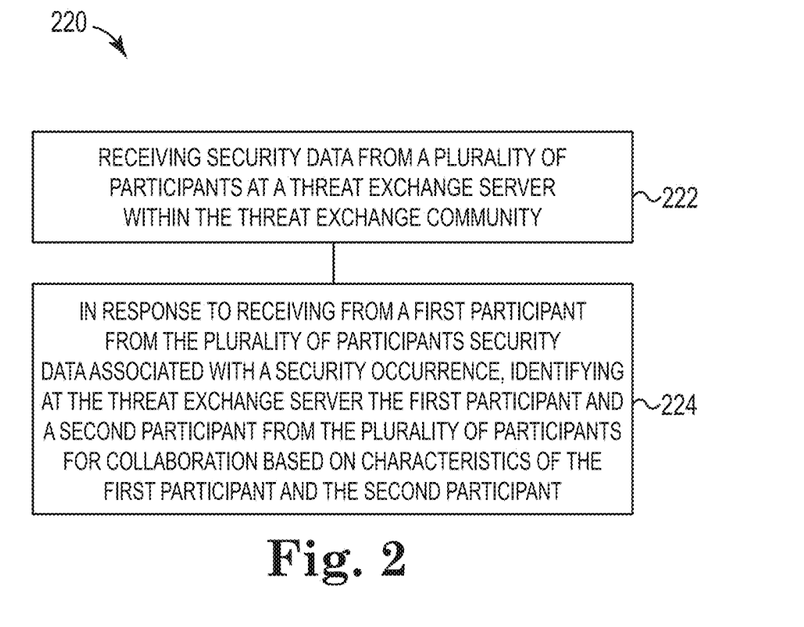
FIG. 2 illustrates a block diagram of an example of a method for identifying participants for collaboration in a threat exchange community according to the present disclosure.

FIG. 2 illustrates a block diagram of an example of a method 220 for identifying participants for collaboration in a threat exchange community according to the present disclosure. At 222, the method 220 can include receiving security data regarding a security occurrence from a first participant within the threat exchange community. The security data regarding a security occurrence can be identified by the first participant through the use of an Intrusion Detection System (IDS), and/or through the use of a Security Incident and Event Management (SIEM) system which receives inputs from one or more IDSs. An IDS can be a computing resource and/or a computer readable medium that monitors a network and/or system activities for security occurrence and produces reports. In a number of examples, the IDS can include an Intrusion Detection and Prevention System (IDPS) and can identify possible security occurrences. The IDS can record security occurrences, notify security administrators of observed security occurrences, produce reports, and/or attempt to prevent security occurrences.

Based on the security data provided from a first participant, a security occurrence of the first participant can be identified. Identifying the security occurrence can include identifying a characteristic of the security occurrence. A characteristic of a security occurrence, as used herein, can include an identified symptom associated with the security occurrence. As mentioned earlier, a symptom can include a pattern of a plurality of actions, incidents, and/or events associated with the security occurrence, and/or an internet protocol (IP) address associated with the security occurrence, for example. For instance, a security occurrence (e.g. a security attack) can attack a number of entities based on the geographic location of each of the number of entities and the symptom associated with the security attack can include the order in which the other entities within that region were attacked.

At 224, the method 220 can include in response to receiving the security data, identifying the first participant and a second participant for collaboration within the threat exchange community using a threat exchange server. Identifying participants for collaboration can be based on participant characteristics of the first participant and the second participant.

In a number of examples, the threat exchange server can automatically identify a number of other participants for collaboration with the first participant based on the security data and/or the participant characteristics. The first participant can report security data to the threat exchange server. From the security data, the threat exchange server can identify a security occurrence and a symptom associated with that security occurrence. The threat exchange server can identify that the first participant and a second participant reported a historical security occurrence that at least partially included the identified symptom associated with the security occurrence and the threat exchange server may recommend to the first participant and the second participant that they collaborate to respond to the security occurrence.

In a number of examples, the threat exchange server can identify a second participant for collaboration with the first participant in response to receiving a request for collaboration from the first participant and based on security data and/or participant characteristics. Using the threat exchange server and a number of communication links, the first participant can report security data to the threat exchange server and request that the threat exchange server identify a second participant for collaboration.

In other examples, the threat exchange server can provide an anonymous forum to enable threat exchange participants to collaborate without a recommendation from the threat exchange server. The forum may be a message board, an online discussion site, a chat room, and/or online bulletin board, for example. The forum can be a web application managing participant-generated content. In some examples, the forum can be moderated, requiring review and approval of messages before they are visible on the forum.

Using the threat exchange server, a first participant can collaborate with a second participant on the anonymous forum. For instance, the first participant may report to the threat exchange server security data. From the security data, the threat exchange server can identify a security occurrence and a symptom associated with that security occurrence. However, the threat exchange server may be unable to identify a second participant to collaborate with the first participant. The first participant may, using the threat exchange server, submit a request for collaboration, requesting that other participants within the threat exchange community review the security data, security occurrence, and/or symptom. The first participant and the other participants, each identified by a unique pseudonym assigned for use with that particular request for collaboration, can anonymously collaborate on the forum to respond to the security occurrence.

In some examples, participants engaging in collaboration on an anonymous forum may wish to disclose their identities to one another. Participants can communicate directly, using the threat exchange server and/or a secure communication link.

Figure 3:
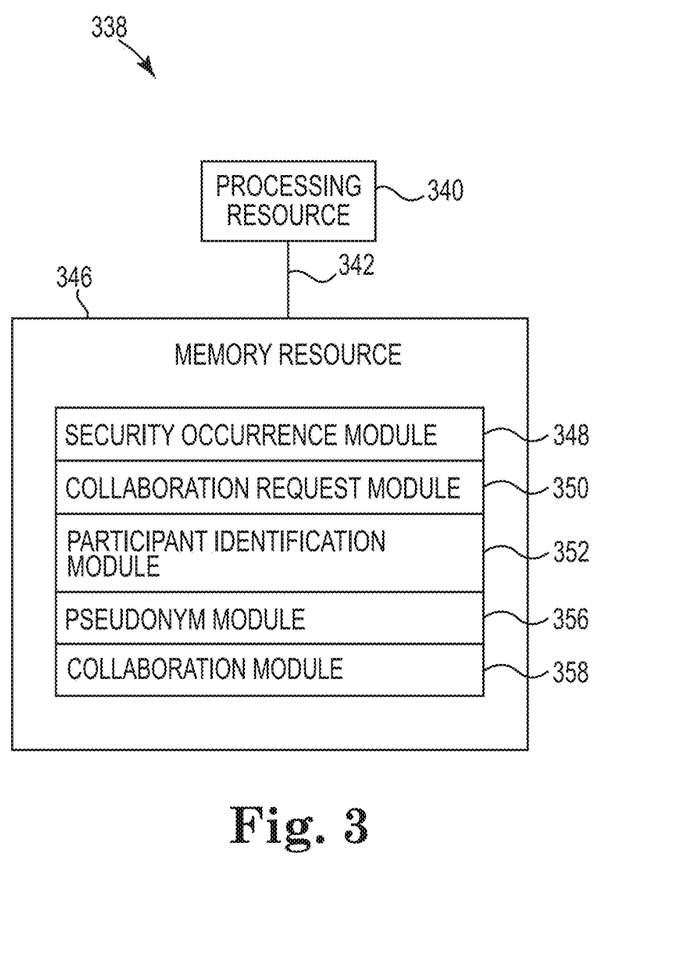
FIG. 3 illustrates an example of a computing system according to the present disclosure.

FIG. 3 illustrates an example of a computing system according to the present disclosure. The system 338 can utilize software, hardware, firmware, and/or logic to perform a number of functions.

The system 338 can be a combination of hardware and program instructions configured to identify participants for collaboration in a threat exchange community. The hardware, for example, can include a processing resource 340, and/or a memory resource 346, (e.g., computer-readable medium (CRM), machine readable medium (MRM), database, etc.). A processing resource 340, as used herein, can include any number of processors capable of executing instructions stored by a memory resource 346. Processing resource 340 may be integrated in a single device or distributed across devices. Program instructions (e.g., computer-readable instructions (CRI)) can be stored on the memory resource 346 and executable by the processing resource 340 to implement a desired function (e.g., continuously collect security data from a first participant within a threat exchange community, etc.).

The memory resource 346 can be in communication with a processing resource 340. A memory resource 346, as used herein, can include any number of memory components capable of storing instructions that can be executed by processing resource 340. One example of a memory resource 346 is a non-transitory CRM. Memory resource 346 may be integrated in a single device or distributed across devices. Further, memory resource 346 may be fully or partially integrated in the same device as processing resource 340 or it may be separate but accessible to that device and processing resource 340. Thus, it is noted that the system 338 may be implemented on a user and/or a client device, on a server device and/or a collection of server devices, and/or on a combination of the user device and the server device and/or devices in a distributed computing environment.

The processing resource 340 can be in communication with a memory resource 346 storing a set of CRI executable by the processing resource 340, as described herein. The CRI can also be stored in remote memory managed by a server and represent an installation package that can be downloaded, installed, and executed. The processing resource 340 can execute CRI to perform various functions, including the functions described with respect to FIG. 1 and FIG. 2. For example, the processing resource 340 can execute CRI to identify participants for collaboration in a threat exchange community.

The CRI can include a number of modules 348, 350, 352, 356, 358. The number of modules 348, 350, 352, 356, 358 can include CRI that when executed by the processing resource 340 can perform a particular action, task or function to achieve a specific result.

The number of modules 348, 350, 352, 356, 358 can be sub-modules of other modules. For example, the security context module 348 and the collaboration request module 350 can be sub-modules and/or contained within the same computing device. In another example, the number of modules 348, 350, 352, 356, 358 can comprise individual modules at separate and distinct locations (e.g., CRM, etc.).

A security occurrence module 348 can include CRI that when executed by the processing resource 340 can provide a number of security data collection functions. The security occurrence module 348 can collect, using a threat exchange server, security data from a first participant within the threat exchange community. For instance, the security occurrence module 348 can use a threat exchange server to collect the security data, including security occurrences, via communication links within the threat exchange community (e.g., communication links from the participants to the threat exchange server). The collected security data can be stored, for instance, in an incident database located on the threat exchange server.

A collaboration request module 350 can include CRI that when executed by the processing resource 340 can perform a number of collaboration request functions. The collaboration request module 350 can receive a request for collaboration from a first participant in response to a security occurrence. The collaboration request module 350 can include instructions to receive a collaboration request in response to receiving a security occurrence.

A participant identification module 352 can include CRI that when executed by the processing resources 340 can perform a number of participant identification functions. The participant identification module 352 can identify a second participant for collaboration within the threat exchange community based on participant characteristic data and the security occurrence including symptoms associated with the security occurrence. In various examples, the participant characteristic data can include the size of the participant, the industry of the participant, permitted collaboration lists, and/or infrastructure information. For instance, participant characteristic data can include Basic Input/Output System (BIOS) and/or kernels utilized within the participant infrastructure. The participant identification module 352 can identify participants for collaboration based on historical security data, including previous security attacks, security threats, and/or other suspicious events identified by the participant.

A pseudonym module 356 can include CRI that when executed by the processing resource 340 can perform a number of pseudonym functions. The pseudonym module 356 can assign a pseudonym to the first participant and the second participant. For instance, the pseudonym module 356 can assign a pseudonym of 1234ABCD to a first participant and a pseudonym of 3456DEFG to a second participant, for use with a particular request for collaboration. In various examples, a new pseudonym can be assigned to the first participant and the second participant for use with each new request for collaboration.

A collaboration module 358 can include CRI that when executed by the processing resource 340 can perform a number of collaboration functions. The collaboration module 358 can automatically identify the first participant and the second participant for collaboration using a threat exchange server, e.g., as discussed in connection with FIG. 1 and FIG. 2.

A memory resource 346, as used herein, can include volatile and/or non-volatile memory. Volatile memory can include memory that depends upon power to store information, such as various types of dynamic random access memory (DRAM), among others. Non-volatile memory can include memory that does not depend upon power to store information. The memory resource 346 can be integral, or communicatively coupled, to a computing device, in a wired and/or a wireless manner.

The memory resource 346 can be in communication with the processing resource 340 via a communication path 342 (e.g., a communication link). The communication path 342 can be local or remote to a machine (e.g., a computing device) associated with the processing resource 340. Examples of a local communication path 342 can include an electronic bus internal to a machine (e.g., a computing device) where the memory resource 346 is one of volatile, non-volatile, fixed, and/or removable storage medium in communication with the processing resource 340 via the electronic bus.

The communication path 342 can be such that the memory resource 346 is remote from the processing resource 340, such as in a network connection between the memory resource 346 and the processing resource 340. That is, the communication path 342 can be a network connection. Examples of such a network connection can include a local area network (LAN), wide area network (WAN), personal area network (PAN), and the Internet, among others. In such examples, the memory resource 346 can be associated with a first computing device and the processing resource 340 can be associated with a second computing device (e.g., a Java® server). For example, a processing resource 340 can be in communication with a memory resource 346, wherein the memory resource 346 includes a set of instructions and wherein the processing resource 340 is designed to carry out the set of instructions.

The processing resource 340 coupled to the memory resource 346 can execute CRI to collect, using a threat exchange server, a security occurrence from a first participant within a threat exchange community. The processing resource 340 coupled to the memory resource 346 can also execute CRI to receive a request for collaboration from the first participant in response to the security occurrence. The processing resource 340 coupled to the memory resource 346 can also execute CRI to identify a second participant for collaboration within the threat exchange community based on participant characteristic data and the security occurrence. The processing resource 340 coupled to the memory resource 346 can also execute CRI to assign a pseudonym to the first participant and the second participant. Further, the processing resource 340 coupled to the memory resources 346 can also execute CRI to automatically identify the first participant and the second participant for collaboration using a threat exchange server.

As used herein, "logic" is an alternative or additional processing resource to perform a particular action and/or function, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for identifying participants for collaboration in a threat exchange community implemented by a threat exchange server comprising a physical processor that implements computer readable instructions, the method comprising:
    receiving, by the processor of the threat exchange server, security data from a plurality of participants within the threat exchange community;
    in response to receiving from a first participant from the plurality of participants security data associated with a security occurrence, identifying, by the processor of the threat exchange server the first participant and a second participant from the plurality of participants for collaboration based on characteristics of the first participant and the second participant;
    creating, by the processor of the threat exchange server, a first level of anonymity between the first participant and the second participant for anonymously collaborating; and
    creating, by the processor of the threat exchange server, a second level of anonymity between the first participant and the second participant, for responding to the security occurrence.

2. The method of claim 1, comprising identifying, by the processor of the threat exchange server, the security occurrence based on an analysis of the security data associated with the security occurrence.

3. The method of claim 1, comprising:
    identifying, by the processor of the threat exchange server, that the first participant and the second participant reported a historical security occurrence that at least partially includes an identified symptom associated with the security occurrence.

4. The method of claim 1, comprising receiving, by the processor of the threat exchange server and from the first participant, participant characteristic data.

5. The method of claim 4, wherein the participant characteristic data includes a permitted collaboration list that identifies information related to participants the first participant is willing to collaborate with.

6. The method of claim 1, wherein identifying, by the processor of the threat exchange server, the first participant and the second participant is based on security data received from the first participant.

7. The method of claim 1, wherein the second level of anonymity is created in response to receiving, by the processor of the threat exchange server, a request for collaboration from the first participant.

8. The method of claim 3, comprising recommending, using the processor of the threat exchange server, to the first participant and the second participant collaboration between the first participant and the second participant to respond to the security occurrence.

9. The method of claim 1, wherein the characteristics of the second participant include a confidence rating of the second participant, wherein the confidence rating is based on a complexity of past contributions in the threat exchange community.

10. A non-transitory computer-readable medium storing a set of instructions executable by a processing resource, wherein the set of instructions are executed to cause a computer to:
    receive a security occurrence from a first participant in a threat exchange community;
    receive from the first participant, a request for collaboration within the threat exchange community in response to the security occurrence;
    assign a first unique pseudonym to the first participant;
    identify a second participant in the threat exchange community to collaborate with the first participant based on the security occurrence and participant characteristic data of the first participant and the second participant;
    assign a second unique pseudonym to the second participant;
    in response to identifying the second participant, assign a third unique pseudonym to the first participant and a fourth unique pseudonym to the second participant; and
    provide a forum for the first participant and the second participant to collaborate using the third unique pseudonym and the fourth unique pseudonym.

11. The non-transitory computer-readable medium of claim 10, wherein the instructions executable to identify the second participant in the threat exchange community include instructions to receive a response from the second participant in response to the request for collaboration from the first participant.

12. The non-transitory computer-readable medium of claim 10, wherein the instructions executable to identify the second participant in the threat exchange community include instructions to:
    assign a first confidence rating to the first participant and a second confidence rating to the second participant wherein the first confidence rating represents a first security expertise of the first participant and the second confidence rating represents a second security expertise of the second participant.

13. A system for identifying participants for collaboration in a threat exchange community comprising:
    a threat exchange server comprising a physical processor implementing machine readable instructions stored on a non-transitory machine-readable storage medium that cause the system to:
        collect, using the threat exchange server, a security occurrence from a first participant within a threat exchange community, wherein a first unique pseudonym is associated with the first participant;

receive, by the threat exchange server, a request for collaboration from the first participant in response to the security occurrence;

identify, by the threat exchange server, a second participant for collaboration within the threat exchange community based on participant characteristic data that is associated with the first participant and the second participant and the security occurrence, wherein a second unique pseudonym is associated with the second participant;

in response to identifying the second participant, assign, by the threat exchange server, a third unique pseudonym to the first participant and a fourth unique pseudonym to the second participant; and automatically recommend, by the threat exchange server, to the first participant and the second participant that the first participant collaborate with the second participant, wherein the first participant collaborates using the third unique pseudonym, and the second participant collaborates using the fourth unique pseudonym.

14. The system of claim 13, wherein the physical processor implements machine readable instructions that cause the system to identify a symptom associated with the security occurrence.

15. The system of claim 14, wherein the physical processor implements machine readable instructions that cause the system to identify a historical security occurrence of the second participant wherein the historical security occurrence of the second participant is correlated to the security occurrence through the symptom.

16. The system of claim 13, wherein the physical processor implements machine readable instructions that cause the system to:

create a first level of anonymity for the first participant and the second participant by the assigning of the first unique pseudonym to the first participant and the assigning of the second unique pseudonym to the second participant; and create a second level of anonymity for the first participant and the second participant by the assigning of the third unique pseudonym to the first participant and the assigning of the fourth unique pseudonym to the second participant.

17. The non-transitory computer-readable medium of claim 10, wherein the instructions executable to assign the first confidence rating and the second confidence rating include instructions that cause the system to determine a complexity of past contributions in the threat exchange community, and wherein the instructions executable to identify the second participant in the threat exchange community include instructions that cause the system to identify the second participant based on the first confidence rating and the second confidence rating.

18. The non-transitory computer-readable medium of claim 10, wherein the instructions executable to identify the second participant in the threat exchange community include instructions that cause the system to:

create a first level of anonymity for the first participant and the second participant by the assigning of the first unique pseudonym to the first participant and the assigning of the second unique pseudonym to the second participant; and create a second level of anonymity for the first participant and the second participant by the assigning of the third unique pseudonym to the first participant and the assigning of the fourth unique pseudonym to the second participant.

19. The system of claim 13, wherein the physical processor implements machine readable instructions that cause the system to determine whether the second participant is approved for collaboration by the first participant.

20. The system of claim 19, wherein the physical processor implements machine readable instructions that cause the system to remove the second participant from a pool of possible collaboration participants responsive to determining that the second participant is not approved for collaboration by the first participant.

* * * * *